Sept. 21, 1965

H. H. SARKISSIAN 3,207,978

MAGNETIC FIELD DETECTOR UTILIZING
RESONANT NON-LINEAR INDUCTORS

Filed May 20, 1960

INVENTOR
Hrant H. Sarkissian
BY Henry L. Shenier
ATTORNEY

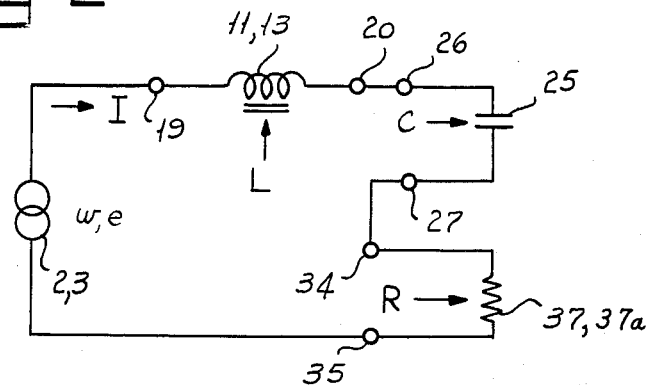
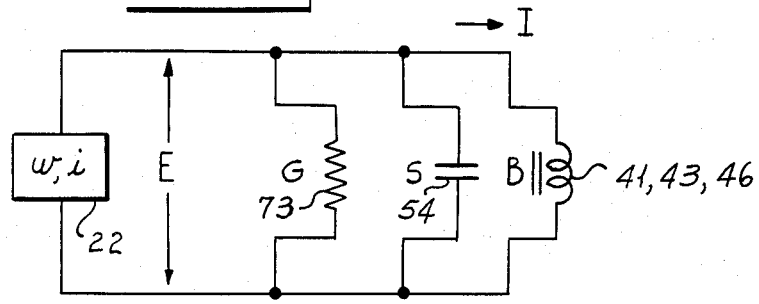
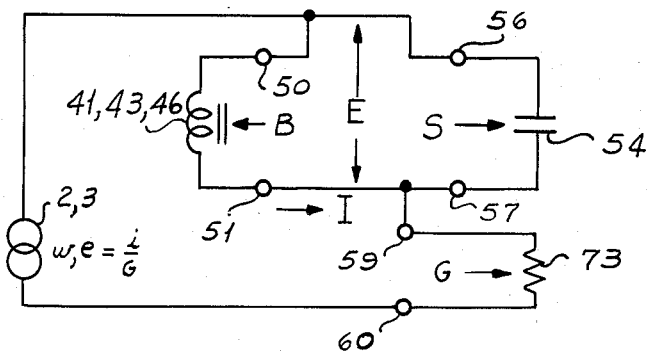
INVENTOR
Hrant H. Sarkissian
BY Henry L. Shenier
ATTORNEY 3,207,978
MAGNETIC FIELD DETECTOR UTILIZING RESONANT NON-LINEAR INDUCTORS
Hrant H. Sarkissian, Pacific Palisades, Calif., assignor to United Aircraft Corporation, East Hartford, Conn., a corporation of Delaware
Filed May 20, 1960, Ser. No. 30,629
19 Claims. (Cl. 324—43)

My invention relates to a magnetic field detector and more particularly to a high-gain amplifier employing a nonlinear inductance responsive to magnetic fields.

This application is a continuation-in-part of my co-pending application, Serial No. 618,392 filed October 25, 1956 and now abandoned.

In the prior art, high Q resonance circuits with linear inductors have been employed. Magnetic fields are coupled to vary the inductance and hence the response of the circuit. The gain of such circuits is proportional to their Q values. In order to achieve high gain the dissipation must be held to small values. But this creates a small band width and the overall gain drops drastically with increasing frequency of the input magnetic field. Since the dissipation of these circuits is limited to a compromise value between high gain and high band-width, auxiliary buffer amplifiers must be used to supply appreciable power to an output load. Such circuits employing linear inductances may provide either amplitude sensitive or phase sensitive outputs, each dependent upon the rapid change of phase angle and amplitude of a high Q circuit for small detuning from resonance.

Also in the prior art nonlinear inductances have been employed. A magnetic amplifier employs a highly nonlinear inductance using special magnetic materials having a sharp knee or point of saturation. Magnetic amplifiers act much as switches and produce wave forms very similar to thyratrons. These output wave forms exhibit high-frequency switching transients. Since magnetic amplifiers inherently depend upon the generation of high-frequency transients, the carrier excitation frequencies are limited which in turn impairs response to higher intelligence frequencies.

Further in the prior art have been employed nonlinear inductances having gradual changes in permeability with current. Such gradually saturating nonlinear inductances are used in constant voltage regulating transformers. These gradually saturating nonlinear inductances have also been used in "ferro-resonant" circuits to provide constant voltage or constant current devices. The characteristics of these ferro-resonant circuits are such that variations in input voltage or input current may be compensated to provide substantially constant output voltage or current. This well-known voltage or current regulating property of ferro-resonant circuits has also been employed in flip-flop devices employing a pair of nonlinear inductors coupled to a high impedance supply voltage so that at least one inductor must draw high current but that both cannot because of the drop in supply voltage due to its high impedance.

I have invented a magnetic field detector employing a gradually saturating nonlinear inductance having an extremely high gain which may approach infinity, having a large band-width extending from zero cycles per second to very high frequencies, and having appreciable power output capabilities.

One object of my invention is to provide a magnetic field detector having a high gain which approaches infinity.

Another object of my invention is to provide a magnetic field detector having a large band-width extending to zero cycles per second.

A further object of my invention is to provide a magnetic field detector having high power-output capabilities.

Other and further objects of my invention will appear from the following description.

In general my invention contemplates the provision of a nonlinear inductor the inductance of which gradually decreases with increase in current. I provide a source of alternating current of a fixed frequency and voltage. I further provide resistive and reactive elements. The magnetic field to be detected is coupled to the nonlinear inductor. By selecting a predetermined operating point for the inductor in conjunction with appropriate connections of predetermined values of the resistive and reactive elements, the circuit gain may be made a constant high value over a wide range of output currents and voltages because of the negative incremental inductance of the nonlinear inductor.

In the accompanying drawings which form part of the instant specification and which are to be read in conjunction therewith and in which like reference numerals are used to indicate like parts in the various views:

FIGURE 2 is a schematic view of the series form of my magnetic field detector.

FIGURE 3 is a schematic view of the parallel form of my magnetic field detector excited by a constant current source.

FIGURE 4 is a schematic view of the parallel form of my magnetic field detector excited by a constant voltage source.

Figure 1:
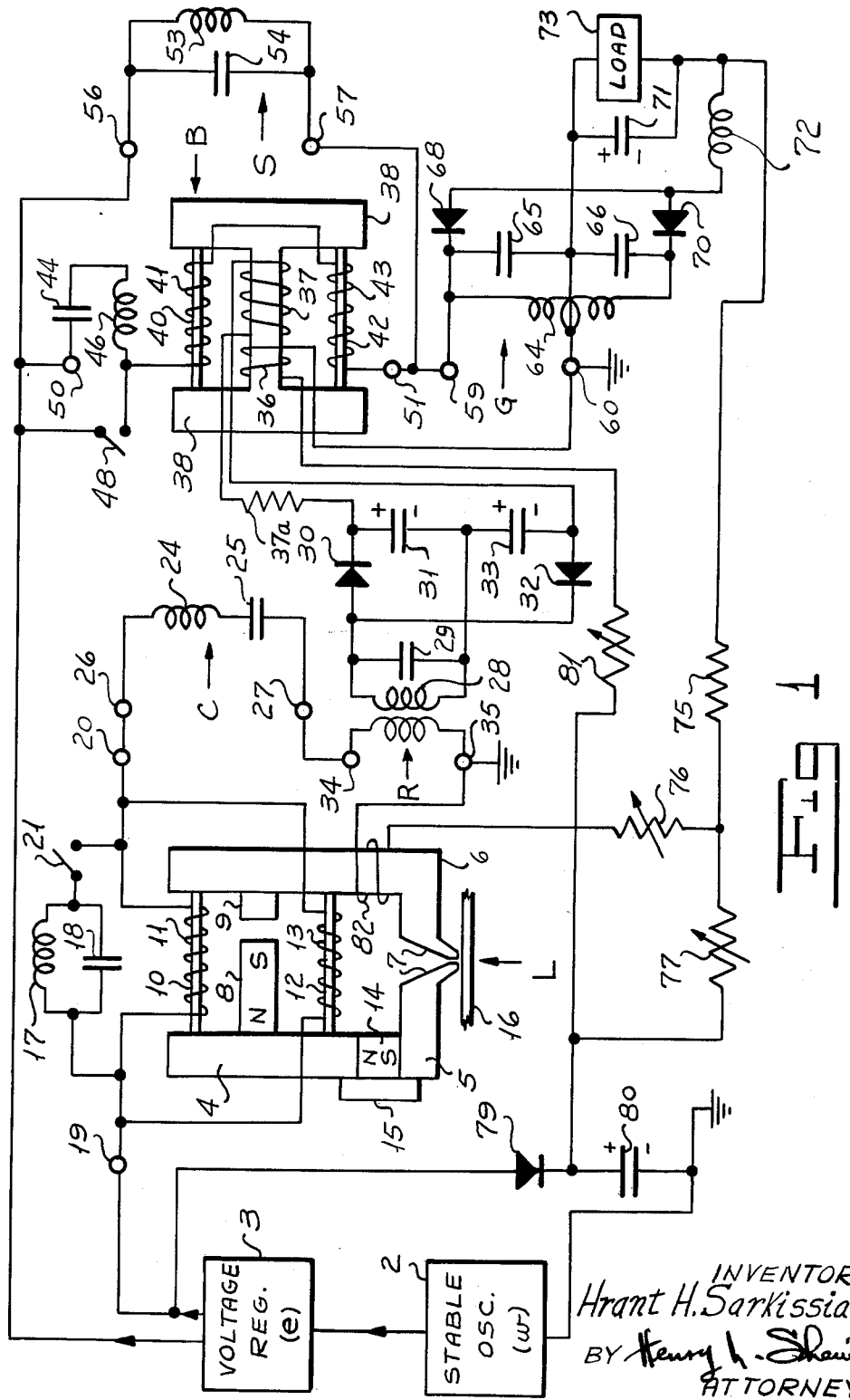
FIGURE 1 is a schematic view of a combination of the series form and of the parallel form of my invention in a two-stage, feedback-stabilized, magnetic field detector.

More particularly referring now to FIGURE 1 of the drawings, I provide a stable oscillator 2 which may be crystal controlled to provide a predetermined carrier angular frequency of $w$ radians per second. One terminal of oscillator 2 is grounded. The output of oscillator 2 is impressed on a voltage regulating circuit 3 of any type well known to the art which provides constant output voltages $e$. One output of voltage regulator 3 is impressed upon terminal 19. Terminal 19 is connected to terminal 20 through parallel windings 11 and 13 which are wound on nonlinear iron cores 10 and 12, respectively. Members 4 and 6 bridge nonlinear cores 10 and 12 to complete a magnetic circuit. Members 4 and 6 preferably have high permeabilities and are operated at such low flux densities that their reluctance drops are negligible compared with cores 10 and 12. Shunting cores 10 and 12 between members 4 and 6, I provide a magnetic circuit comprising a permanent magnet 8 which is separated by an air gap from an adjustable magnetic shim 9. Permanent magnet 8 thus causes flux to flow from left to right in both of cores 10 and 12 biasing them to a certain degree depending upon the length of shim 9. The return path of bias flux from magnet 8 flows through magnetic shim 9 and then through the air gap between shim 9 and magnet 8. Magnet 8 should have a high coercive force; and the air gap between magnet 8 and shim 9 should sustain most of the magnetomotive force of magnet 8 with a small residual M.M.F. drop in cores 10 and 12. The combination of the high coercive force magnet 8 with the large air gap between magnet 8 and shim 9 produces a substantially constant flux source. In series with member 4 is a short permanent magnet 14. Magnet 14 is shunted by an adjustable shim 15. A member 5 is placed in series with magnet 14. Members 5 and 6 are provided with cooperating legs 7 forming a reading head. A tape or other magnetized record 16 is adapted to move adjacent the cooperating reading heads 7. The constant flux source magnet 8 causes a small M.M.F. drop across cores 10 and 12 in producing the biasing flux. The M.M.F. drop across cores 10 and 12 is bucked by the small series permanent magnet 14. The magnetic shim 15 shunting magnet 14 permits flux to flow through magnet 14 thus reducing its coercive force. Shim 15 should be adjusted so that there is no magnetomotive force or flux flow between heads 7. Thus the reading heads then neither magnetize nor demagnetize the magnetic record 16. Coils 11 and 13 are so wound that if current flows from terminal 19 to terminal 20, flux flows from left to right in core 10 and from right to left in core 12, thus producing a clockwise flow of flux in the magnetic circuit comprising cores 10 and 12 and members 4 and 6. Terminal 19 is connected through a parallel circuit comprising a linear inductor 17 and a capacitor 18 to the armature of a normally open switch 21. The contact of switch 21 is connected to terminal 20. The net inductance between terminals 19 and 20 is indicated generally by the reference character L. Terminal 20 is connected to a terminal 26. Terminal 26 is connected through a series circuit comprising a linear inductor 24 and a capacitor 25 to a terminal 27. The net capacitance between terminals 26 and 27 is indicated generally by the reference character C. Terminal 27 is connected to a terminal 34. Terminal 34 is connected to terminal 35 through the primary winding of a transformer 28. Terminal 35 is connected to circuit ground. The secondary winding of transformer 28 is shunted by a capacitor 29. One plate of capacitor 29 is connected forwardly through a crystal 30 to the positive plate of a peak-value filter capacitor 31. The anode of crystal 30 is connected backwardly through a crystal 32 to the negative plate of a peak-value filter capacitor 33. The negative plate of capacitor 31 and the positive plate of capacitor 33 are connected to the other plate of capacitor 29. The positive plate of capacitor 31 is connected through a resistive winding 37 to the negative plate of capacitor 33. The resistance between terminals 34 and 35 looking into transformer 28 is indicated generally by the reference character R.

The other output of voltage regulator 3 is connected to a terminal 50 and to the armature of a normally open switch 48. Terminal 50 is connected through a series circuit comprising a capacitor 44 and a linear inductor 46 to the contact of switch 48. The contact switch 48 is connected serially through a first coil 41 wound on a core 40 and a second coil 43 wound on a core 42 to a terminal 51. Cores 40 and 42 are formed of a gradually saturating ferro-magnetic material. I provide a highly permeable and low reluctance magnetic member 38 having generally the shape of an H for coupling flux to cores 40 and 42. Coils 41 and 43 are so wound that if current flows from terminal 50 to terminal 51, flux will flow from left to right in core 40 and from right to left in core 42 thus causing a clockwise flow of flux in the magnetic circuit including the two cores and the legs of member 38. The inductance seen between terminals 50 and 51 is indicated generally by the reference character B. The terminal 50 is connected to a terminal 56. Terminal 56 is connected through a parallel circuit comprising a linear inductor 53 and a capacitor 54 to a terminal 57. The capacitance seen between terminals 56 and 57 is indicated generally by the reference character S. Terminal 57 is connected to terminal 51 which is in turn connected to a terminal 59. Terminal 59 is connected to the cathode of a crystal 68. The cathode of a crystal 70 is connected to one plate of a capacitor 66 and to one terminal of a center-tapped linear inductor 64. The cathode of crystal 68 is connected to one plate of a capacitor 65 and to another terminal of center-tapped inductor 64. The other plate of each of capacitors 65 and 66 and the center tap of inductor 64 are connected to a terminal 60 which is grounded. The anodes of crystals 68 and 70 are connected through a linear inductor 72 to the negative plate of a filter capacitor 71 and to one terminal of a resistive load 73. The other terminal of load 73 and the positive plate of capacitor 71 are connected to terminal 60. The conductance seen between terminals 59 and 60 is indicated generally by the reference character G. Terminal 19 is connected forwardly through a crystal 79 to the positive plate of a peak-value filter capacitor 80. The negative plate of capacitor 80 is connected to circuit ground. The positive plate of capacitor 80 is connected through a variable bias resistor 81 in series with a bias coil 36 to ground. The positive plate of capacitor 80 is also connected to one terminal of a variable summing resistor 77. The negative terminal of capacitor 71 is connected to one terminal of a summing resistor 75. The other terminals of each of summing resistors 77 and 75 are connected through a variable gain resistor 76 in series with a feedback coil 82 to ground. Feedback coil 82 is wound on member 6. It will be noted that the magnetomotive force of bias magnet 14 and the magnetomotive force across heads 7 produced by magnetic tape 16 and the feedback magnetomotive force produced by coil 82 are in series, and produce a flux which either boosts or bucks that produced by the high reluctance constant flux source magnet 8.

The ferro-resonant circuit including windings 11 and 13 comprises the series-connected form of my magnetic field detector and provides an output across filter capacitors 31 and 33 to the resistive load winding 37, which in turn supplies the input magnetic field to the second amplifying stage, comprising the parallel-connected form of my invention. Winding 37 and bias coil 36 are mounted on the center leg of member 38. With the polarities shown for filter capacitors 31 and 33, winding 37 causes flux to flow from right to left through the center leg of member 38. Bias winding 36, however, tends to produce flux flow from left to right through the center leg of member 38 and thus partially bucks the magnetomotive force of winding 37, biasing cores 40 and 42 to a certain degree. With the connections shown for feedback winding 82 on member 6, the quiescent ampere-turns of winding 37 should exceed the bucking ampere turns provided by bias winding 36. Hence due to the predominant M.M.F. of winding 37, flux will flow from right to left through the center leg of member 38 and then from left to right through each of cores 40 and 42. Adjustment in bias is accommodated by the setting of variable resistor 81. Summing resistor 77 should be adjusted so that when there is no magnetic input from tape 16 the junction of resistors 75, 76, and 77 rests at ground and no current flows through feedback winding 82. Resistors 75 and 77 form a voltage divider between the positive plate of capacitor 80 and the negative plate of capacitor 71.

The net reactance between terminals 19 and 27 comprising L and C must be inductive; and this is in series with the resistance R. An increase in flux through cores 10 and 12 will decrease the inductance L which in turn will decrease the impedance of the series circuit and produce an increase in current. This produces an increased output voltage across R and causes a further decrease in inductance due to increased saturation of cores 10 and 12. The effect is cumulative and by proper apportionment of circuit constants, extremely high gain may be achieved because of the intrinsic positive feedback caused by the negative incremental inductance of the nonlinear cores 10 and 12.

The parallel combination of inductance B between terminals 50 and 51 and capacitance S between terminals 56 and 57 should be capacitive. That is the leading current through the branch 56–57 should exceed the lagging current through the branch 50–51. The net current will be the difference; and, since the capacitive component of current predominates, the parallel circuit appears capacitive. An increase in flux through cores 40 and 42 will cause a decrease in inductance B. This immediately increases the current through windings 41 and 43 thereby reducing the resultant capacitance of the parallel circuit comprising B and S. Less current will flow through conductance G thereby increasing the portion of supply voltage drop across the parallel circuit comprising B and S. The increased voltage across B further increases the current through coils 40 and 42. The increase in current further decreases the inductance B due to partial saturation of coils 40 and 42. This cumulative effect in the parallel circuit configuration is even stronger than in the series circuit configuration. By proper proportioning of circuit constants the gain may be made extremely high because of the intrinsic positive feedback afforded by the negative incremental inductance.

In operation of the magnetic field detector of FIGURE 1 assume that magnetic tape 16 provides a magnetomotive force tending to cause flux to flow from right to left through reading heads 7. Because of the high reluctance of the air gap between magnet 8 and shim 9, substantially all of this reading head flux will flow through cores 10 and 12, thus augmenting the bias flux produced by the high reluctance constant flux source magnet 8. The inductance between terminals 19 and 20 will decrease, thus increasing the current through R and the voltage across output capacitors 31 and 33. This increased voltage produces increased current through winding 37 and increases the saturating flux in cores 40 and 42. The resultant decrease in inductance B decreases the effective capacitance of the parallel circuit comprising B and S, decreasing both the current through and the voltage drop across G. The reduced voltage across load 73 and capacitor 71 results in the negative plate of capacitor 71 becoming more positive. This causes current to flow through winding 82 in a direction producing a magnetomotive force which bucks that produced by tape 16. If the product of the gains of both the series stage and the parallel stage is high, then the bucking magnetomotive force in winding 82 will be almost equal to that caused by the magnetic tape 16. The total closed loop detector gain may be increased by increasing the resistance of feedback resistor 76 or may be reduced by reducing the resistance value of feedback resistor 76.

It will be noted that coils 11 and 13 are connected in parallel between terminals 19 and 20. Hence the voltage across each of coils 11 and 13 must be the same. Because of the bias flux, the current through each of coils 11 and 13 will have appreciable even-harmonic content. However, the total line current will have substantially no even-harmonic content, since even-harmonic currents in the two coils are in phase opposition. Thus although each of coils 11 and 13 operate with free even-harmonic currents, yet, because of the push-pull configuration, the total line current is substantially sinusoidal due to cancellation of the even harmonics. No carrier frequency M.M.F. or harmonic multiple thereof will appear between members 4 and 6; and hence no high frequency flux will flow through either of the shunting magnetic paths comprising reading heads 7 or biasing magnet 8.

It will also be noted that coils 41 and 43 are connected in series between terminals 50 and 51. Hence the current through each of coils 41 and 43 must be the same. Because of the bias flux, the voltage across each coil will have appreciable even-harmonic content. However, the total voltage across the two coils will have substantially no even-harmonic content, since even-harmonic voltages in the two coils are in phase opposition. Thus, although each of coils 41 and 43 operate with free even-harmonic voltages, yet, because of the push-pull configuration, the total voltage across both coils is substantially sinusoidal due to cancellation of the even harmonics. Winding 37 on the center leg of H member 38 is shunted by capacitors 31 and 33 in series. The impedance of these capacitors at even harmonics of the carrier frequency is very low, substantially short-circuiting winding 37. Because of the asymmetrical reluctances of cores 40 and 42, there will exist an even-harmonic M.M.F. between the legs of H member 38. But little second-harmonic flux will flow through the shunting magnetic path afforded by the center leg of members 38, because of the short-circuiting of winding 37 by capacitors 31 and 33 at even harmonics of the carrier frequency thus presenting a high reluctance magnetic shunting path.

Capacitor 29 should be resonant with the magnetizing inductance of transformer 28 at the oscillator carrier angular frequency $w$. Also the circuit comprising center-tapped conductor 64 and capacitors 65 and 66 should likewise be resonant at the oscillator frequency $w$. These parallel resonant tank circuits should have relatively high capacitance values and relatively low inductance values so that their characteristic impedances are not excessively high compared with those presented by output winding 37 and by load 73 respectively. These energy storing "flywheels" supply the current pulses for charging capacitors 31 and 33 and supply the square-wave current for charging capacitor 71 so that the substantially sinusoidal flow of current through the remaining portions of the circuits is not disturbed. However, the characteristic resistance of these tank circuits should not be so low that they impair the response and gain at higher intelligence frequencies.

Referring now to FIGURE 2, I have shown the equivalent circuit of the series-connected form of my magnetic field detector. In FIGURE 2 it can be seen that:

(1) $$I = e\left[R^2 + \left(wL - \frac{1}{wC}\right)^2\right]^{-1/2}$$

Differentiating I with respect to L to find D, the change of current with change in inductance, we obtain:

(2) $$D = \frac{dI}{dL} = -we\left(wL - \frac{1}{wC}\right)\left[R^2 + \left(wL - \frac{1}{wC}\right)^2\right]^{-3}$$

Substituting Equation 1 in Equation 2, we obtain:

(3) $$D = \frac{dI}{dL} = -wI\left(wL - \frac{1}{wC}\right)\left[R^2 + \left(wC - \frac{1}{wC}\right)^2\right]^{-1}$$

Equation 3 is exact, and its application is general. In order to determine the best operating point it is necessary to consider separately the quantity:

(4) $$U = \left(wL - \frac{1}{wC}\right)\left[R^2 + \left(wL - \frac{1}{wC}\right)^2\right]^{-1}$$

We now differentiate the quantity U with respect to L and equate this derivative to zero to find the optimum value of R in terms of the net series inductive reactance $$\left(wL - \frac{1}{wC}\right)$$

Figure 5:
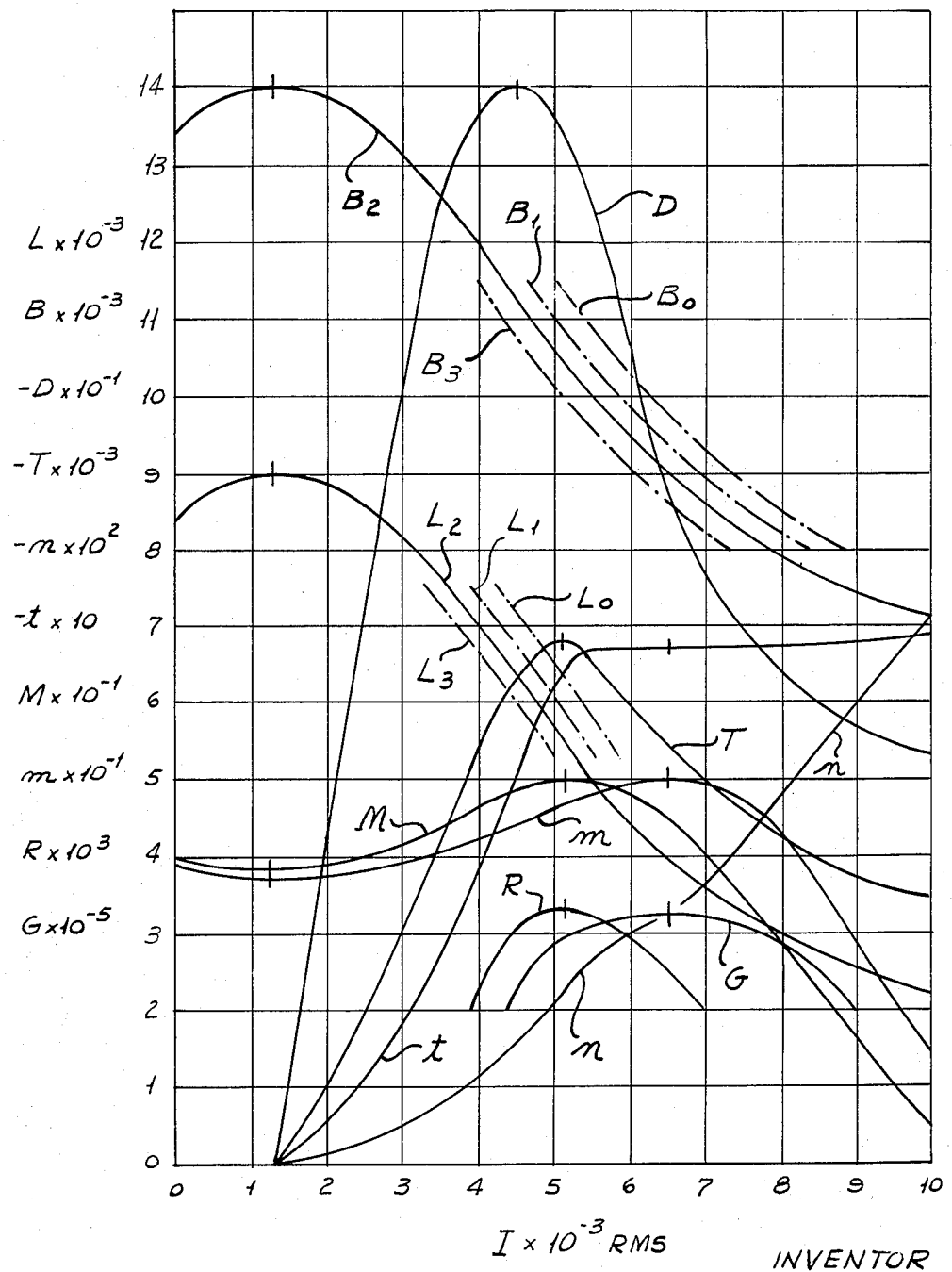
FIGURE 5 is a graph showing the variation in circuit parameters with R.M.S. current through the nonlinear inductors.

The experimental justification for this will appear in connection with FIGURE 5.

(5) $$\frac{dU}{dL} = 0 = -2\left(wL - \frac{1}{wC}\right)^2\left[R^2 + \left(wL - \frac{1}{wC}\right)^2\right]^{-1} + 1$$

Solving for R, we obtain:

(6) $$R = wL - \frac{1}{wC}$$

We now introduce the parameter K defined implicitly by the equation:

(7) $$KR = wL - \frac{1}{wC}$$

Substituting Equation 7 in Equation 3, we obtain:

(8) $$\frac{dI}{dL} = -\frac{wI}{R}\left(\frac{K}{1+K^2}\right)$$

Solving Equation 8 for R, we obtain:

(9) $$R = -wI\left(\frac{dL}{dI}\right)\left(\frac{K}{1+K^2}\right)$$

Let:

(10) $$T = I\left(\frac{dL}{dI}\right) = ID$$

and let:

(11) $$M = \frac{K}{1+K^2}$$

Substituting Equations 10 and 11 into Equation 9, we obtain:

(12) $$R = -wTM$$

Substituting Equation 7 into Equation 1 and solving for $e$, we obtain:

(13) $$e = IR\sqrt{1+K^2}$$

Referring now to FIGURE 3, we have shown the equivalent circuit of the parallel-connected form of my magnetic field detector excited by a constant current source 22. In FIGURE 3 it will be seen that:

(14) $$E = i\left[G^2 + \left(wS - \frac{1}{wB}\right)^2\right]^{-1/2}$$

Differentiating E with respect to B to find the rate of change of voltage with change in inductance, we obtain:

(15) $$\frac{dE}{dB} = -\frac{i}{wB^2}\left(wS - \frac{1}{wB}\right)\left[G^2 + \left(wS - \frac{1}{wB}\right)^2\right]^{-3/2}$$

Substituting Equation 14 into Equation 15, we obtain:

(16) $$\frac{dE}{dB} = -\frac{E}{wB^2}\left(wS - \frac{1}{wB}\right)\left[G^2 + \left(wS - \frac{1}{wB}\right)^2\right]^{-1}$$

Equation 16 is exact, and its application is general. In order to determine the best operating point it is necessary to consider separately the quantity:

(17) $$u = \left(wS - \frac{1}{wB}\right)\left[G^2 + \left(wS - \frac{1}{wB}\right)^2\right]^{-1}$$

Now differentiating the quantity $u$ with respect to B and equating this derivative to zero to find the optimum value of G in terms of the net parallel capacitive susceptance $$\left(wS - \frac{1}{wB}\right)$$

we find:

(18) $$\frac{du}{dB} = 0 = -2\left(wS - \frac{1}{wB}\right)^2\left[G^2 + \left(wS - \frac{1}{wB}\right)^2\right]^{-1} + 1$$

The experimental justification for this will appear in connection with FIGURE 5. Solving Equation 18 for G, we obtain:

(19) $$G = wS - \frac{1}{wB}$$

Let us now introduce the parameter $k$ defined implicitly by the equation:

(20) $$kG = wS - \frac{1}{wB}$$

Substituting Equation 20 into Equation 16, we obtain:

(21) $$\frac{dE}{dB} = -\frac{E}{wB^2G}\left(\frac{k}{1+k^2}\right)$$

Solving Equation 21 for G, we obtain:

(22) $$G = -\frac{E}{wB^2}\left(\frac{dB}{dE}\right)\left(\frac{k}{1+k^2}\right)$$

It will be noted that:

(23) $$\frac{E}{dE} = \frac{wB}{wB}\left(\frac{I}{dI}\right) = \frac{I}{dI}$$

Substituting Equation 23 into Equation 22, we obtain:

(24) $$G = -\frac{I}{wB^2}\left(\frac{dB}{dI}\right)\left(\frac{k}{1+k^2}\right)$$

Let:

(25) $$m = \frac{k}{1+k^2}$$

and let:

(26) $$t = \frac{I}{B^2}\left(\frac{dB}{dI}\right)$$

Substituting Equations 25 and 26 into Equation 24, we obtain:

(27) $$G = -\frac{tm}{w}$$

Substituting Equation 20 into Equation 14 and solving for $i$, we obtain:

(28) $$i = EG\sqrt{1+k^2} = wBIG\sqrt{1+k^2}$$

Referring now to FIGURE 4 it will be seen that the constant voltage source and constant current source equivalent circuits are related by the following equation:

(29) $$e = iR = \frac{i}{G}$$

Substituting Equation 28 into Equation 29, we obtain:

(30) $$e = wBI\sqrt{1+k^2}$$

Let us now design some specific circuits with the use of the foregoing equations. Referring to FIGURE 5 the curve $L_2$ is a plot of the combined inductance of coils 11 and 13 against current for the particular value of bias flux provided by permanent magnet 8. This bias flux is 100 gauss. Curve $L_2$ has a maximum value of 9 millihenrys at 1.3 milliamperes. The curve $L_0$ is a plot of inductance against current with no bias flux. The family of curves $L_0$ through $L_3$ also contains $L_1$ with a bias flux of 50 gauss and $L_3$ with a bias flux of 150 gauss. Suppose that it is desired to detect magnetic fields varying from a rate of zero cycles per second to 16,000 cycles per second. The carrier frequency of the stable oscillator 2 should be moderately high compared with the maximum anticipated intelligence frequency of 16,000 cycles per second. Accordingly we may select a carrier frequency of 160,000 cycles per second which is ten times the maximum intelligence frequency. A frequency of 160 kilocycles represents an angular frequency $w$ of approximately $10^6$ radians per second. Curve D is a plot of $$-\frac{dL}{dI}$$

which has a peak value of $-1.4$ henrys per ampere at 4.5 milliamperes. Curve T is a plot of $$-I\left(\frac{dL}{dI}\right) = -ID$$

which has a peak value of $-6.8$ millihenrys at 5.1 milliamperes. The proper operating point for the inductor is at 5.1 milliamperes where the curve T exhibits its peak value which remains substantially constant for small changes in current. The maximum value of $$M = \frac{K}{1+K^2}$$

is $M = 0.5$ for $K = 1$. Employing Equation 12 to determine R, we find:

(31) $$R = -10^6(-6.8 \times 10^3)(0.5) = 3,400 \text{ ohms}$$

At the operating point of 5.1 milliamperes, the inductance from curve $L_2$ is 5.4 millihenrys. At the operating point $K=1$; and, from Equation 7:

(32) $$\frac{1}{wC}=wL-R=10^6(5.4\times 10^{-3})-3,400=2,000 \text{ ohms}$$

This equivalent capacitive reactance of 2,000 ohms may be provided by capacitor 25. Preferably inductor 24 is eliminated and capacitor 25 has the value:

(33) $$C=\frac{1}{2,000w}=\frac{1}{2,000(10^6)}=500 \text{ micromicrofarads}$$

With this value of capacitance C, curve M is a plot of
$$\frac{K}{1+K^2}$$
which has a maximum value of 0.5 at the operating point of 5.1 milliamperes. Curve R is a fragmentary plot of $-wTM$ which has a maximum value of 3,400 ohms at the operating point of 5.1 milliamperes. If the actual load resistance is equal to R, then the gain will be theoretically infinite. It will be seen that the proper load resistance R for infinite gain decreases for changes in current from the operating point. In order to extend the range of currents over which a constant load resistance is approximately equal to the infinite gain value of resistance R, it may be desirable to reduce the actual load resistance slightly below the operating point infinite gain value of 3,400 ohms. The proper source voltage from regulator 3 at terminal 19, from Equation 13, is:

(34) $e=5.1\times10^{-3}(3,400)\sqrt{2}=24.4$ volts R.M.S.

The equivalent resistance seen between terminals 34 and 35 looking into transformer 28 must be 3,400 ohms. We must now determine the proper resistance value for winding 37. Assume transformer 28 has identical primary and secondary windings so that input and output voltages are equal. The voltage across each of filter capacitors 31 and 33 is substantially equal to the peak value of alternating voltage appearing between terminals 34 and 35. Thus, the D.C. voltage across winding 37 is substantially twice the peak alternating voltage between terminals 34 and 35. This may be expressed as follows:

(35) $$E_{DC}=2\hat{E}_{AC}$$

Since diodes 30 and 32 conduct current pulses only for a short interval when the alternating voltage at terminal 34 is either a positive or a negative maximum, the fundamental component of alternating current will be substantially in phase with the alternating voltage. To determine the peak value of the fundamental component of alternating current requires a Fourier analysis. However, this analysis is simplified by the fact that current flows only when $\theta$ is equal to 90° or 270°; and $\sin\theta$ is substantially equal to unity. This yields a simple relationship between the alternating current and direct current components. Considering the fact that the alternating current is rectified only half-wave by the voltage-doubling arrangement, the relationship between the peak value of the fundamental component of alternating current and the direct current in winding 37 may be shown to be:

(36) $$I_{DC}=\frac{1}{4}\hat{I}_{AC}$$

Dividing Equation 35 by Equation 36, we obtain:

(37) $$R_{DC}=\frac{E_{DC}}{I_{DC}}=8\frac{\hat{E}_{AC}}{\hat{I}_{AC}}=8R_{AC}$$

Using Equation 37 to determine the proper D.C. resistance value of winding 37 so that the A.C. resistance seen between terminals 34 and 35 is 3,400 ohms, we find:

(38) $R_{DC}=8(3,400)=27,200$ ohms

This of course assumes a unity turns ratio for transformer 28. For a turns ratio of one-half, where the secondary has half as many turns as the primary of transformer 28, then the D.C. resistance of load winding 37 should be reduced to one-quarter of 27,200 ohms or to 6,800 ohms. As is well known to the art, the impedance levels of transformers vary as the square of the turns ratio.

In designing the parallel-connected form of my invention, it will be assumed that coils 41 and 43 each have half as many turns as coils 11 and 13 and that the cores 10, 12, 40, and 42 are identical. Thus, the curve $L_2$ of equivalent inductance against current for parallel coils 11 and 13 will also apply for series coils 41 and 43 if resistor 82 is adjusted to provide a bias flux of 100 gauss. Curve $n$ is plot of the quantity:

(39) $$n=\frac{I}{L^2}\left(\frac{dL}{dI}\right)=\frac{ID}{L^2}=\frac{T}{L^2}$$

It will be seen that curve $n$ has no maximum value which would determine an operating point, as does curve T. Curve $n$ applies if switch 48 is closed to by-pass inductor 46. This is due to the higher cumulative or regenerative effect of the parallel circuit compared with the series circuit because of a greater intrinsic positive feedback. From Equation 39 it may be noted that if the percentage change in L were small, that is, if L were substantially constant, then the shape of curve $n$ would approach that of curve T, and likewise exhibit a maximum value at a current of 5.1 milliamperes. We may reduce the sensitivity of the parallel circuit by inserting an inductive reactance in series with coils 41 and 43, the total inductance between terminals 50 and 51 being B at the carrier frequency $w=10^6$ radians per second. Preferably capacitor 44 is eliminated so that the entire desensitizing inductive reactance is supplied by inductor 46 with switch 48 open as shown. Since inductor 46 is linear the following equality applies:

(40) $$\frac{dL}{dI}=\frac{dB}{dI}$$

Substituting Equation 40 into Equation 26, we obtain:

(41) $$t=\frac{I}{B^2}\left(\frac{dL}{dI}\right)=\frac{ID}{B^2}=\frac{T}{B^2}$$

Curve $B_2$ is a plot of the combined inductance of coils 41 and 43 in series with an inductance value for inductor 46 of five millihenrys with a bias flux of 100 gauss. The family of curves $B_0$ through $B_3$ also contains $B_0$ with no bias flux, $B_1$ with a bias flux of 50 gauss, and $B_3$ with a bias flux of 150 gauss. Since inductor 46 has a value of 5 millihenrys, curve $B_2$ has a maximum of 14 millihenrys at 1.3 milliamperes. Curve $t$ is a plot of
$$-\frac{T}{B^2}$$
which has a substantially constant value of 66 reciprocal henrys over a wide range of currents from 5.5 milliamperes to 7.5 milliamperes. The operating point for the inductor may conveniently be centered within this range at the current value of 6.5 milliamperes. It was found that for higher inductance values of inductor 46, the curve $t$ exhibited a peak value and tended more and more to assume the shape of curve T. It was found that for smaller values of inductor 46, curve $t$ exhibited no peak value and tended more and more to assume the shape of curve $n$. The value for inductor 46 is not critical; but a value of approximately 5 millihenrys seems best. The maximum value of
$$m=\frac{k}{1+k^2}$$
is $m=0.5$ for $k=1$. Employing Equation 27 to determine G, we find:

(42) $$G=\frac{-(-66)(0.5)}{10^6}=33 \text{ micromhos}$$

At the operating point of 6.5 milliamperes the inductance from curve $B_{1/2}$ is 9.0 milliamperes. At the operating point $k=1$; from Equation 20:

(43)
$$wS = G\frac{1}{wB} = 33 \times 10^{-6} + \frac{1}{10^6(9 \times 10^{-3})} = 144 \text{ micromhos}$$

This equivalent capacitive susceptance of 144 micromhos is provided by capacitor 54. Inductor 53 should be eliminated; and capacitor 54 should have the value:

(44)
$$S = \frac{144 \times 10^{-6}}{w} = \frac{144 \times 10^{-6}}{10^6} = 144 \text{ micromicrofarads}$$

With this value of capacitance S, curve $m$ is a plot of $$\frac{k}{1+k^2}$$

which has a maximum value of 0.5 at the operating point of 6.5 milliamperes. Curve G is a fragmentary plot of $$-\frac{tm}{W}$$

which has a maximum value of 33 micromhos at the operating point of 6.5 milliamperes. If the actual load conductance is equal to G, then the gain will be infinite. It will be seen that the proper load conductance G for infinite gain decreases for changes in current from the operating point. In order to extend the range of currents over which a constant load conductance is approximately equal to the infinite gain value of conductance G, it may be desirable to reduce the actual load conductance slightly below the operating point infinite gain value of 33 micromhos. The proper source voltage from regulator 3 at terminals 59 and 56, from Equation 30, is:

(45) $e = 10^6 (9 \times 10^3)(6.5 \times 10^{-6})\sqrt{2} = 82.6$ volts R.M.S.

The equivalent conductance seen between terminals 59 and 60 must be 33 micromhos. This represents a resistance of 30,300 ohms. We must now determine the proper resistance value for load 73. The rectification is full-wave; and the relationship between the D.C. output voltage and the peak value of A.C. input voltage may, by a Fourier analysis, be shown to be:

(46)
$$E_{DC} = \frac{2}{\pi}\hat{E}_{AC}$$

Because of the provision of filter inductor 72 the current flow may be assumed square wave if the inductance value for inductor 72 is sufficiently large that exciting current is negligible compared with load current. A Fourier analysis shows the relationship between the D.C. load current and the peak value of alternating current to be:

(47)
$$I_{DC} = \frac{\pi}{4}\hat{I}_{AC}$$

Dividing Equation 47 by Equation 46 we obtain:

(48)
$$R_{DC} = \frac{E_{DC}}{I_{DC}} = \frac{8}{\pi^2}\frac{\hat{E}_{AC}}{\hat{I}_{AC}} = \frac{8}{\pi^2}R_{AC}$$

Using Equation 48 to determine the proper D.C. resistance value of load 73 so that the A.C. resistance seen between terminals 59 and 60 is 30,300 ohms, we find:

(49) $R_{DC} = \frac{8}{\pi^2}(30,300) = 24,500$ ohms

This value for load resistor 73 contemplates that the loading introduced in the feedback circuit by resistor 75 is negligible. Actually of course, the equivalent resistance both of load 73 and of the shunting feed-back resistor 75 should be 24,500 ohms or perhaps slightly greater to extend the range of currents of which the load conductance is matched to the infinite gain value G.

It will be noted that for the series circuit the curve T exhibits a much sharper peak than does curve M. Thus, curve R exhibits a narrow peak determined mainly by characteristic of curve T. For the parallel circuit it will be noted that curve $t$ exhibits a substantially constant value over the operating range while curve $m$ exhibits a broad peak. Thus, curve G exhibits a broad peak determined by the characteristic of curve $m$. The additional parameter comprising the magnitude of inductor 46 enables an increase in the range of currents over which the infinite gain value of conductance G is preserved constant.

Let us now consider the effect of inductor 17 and capacitor 18 for the series circuit. If capacitor 18 is eliminated and if inductor 17 has a value of 5.4 millihenrys which is equal to that provided by coils 11 and 13 at the operating point of 5.1 milliamperes, it will be seen that the total series current must be increased by a factor of two to 10.2 milliamperes in order to maintain the current through coils 11 and 13 at their operating point value of 5.1 milliamperes. The equivalent inductance will be reduced by a factor of two to 2.7 millihenrys, providing an inductive reactance of 2,700 ohms. The rate of change of inductance with current $$\frac{dL}{dI} = D$$

will be reduced by a factor of eight. The maximum value of quantity $T = ID$ will be reduced by a factor of four to $-1.7$ millihenrys which will now occur at 10.2 milliamperes. The maximum value of $R = -wTM$ will be reduced by a factor of four to 850 ohms. The reactance provided by capacitor 25 must be reduced to 1850 ohms, requiring an increase in capacitance to 550 micromicrofarads. The input voltage must be reduced by a factor of two to 12.2 volts R.M.S. However, the new curves T, M, and R will have generally the same characteristics as shown in FIGURE 5. The new curve R will have a narrow peak determined mainly by the narrow peak of the new curve T. Of course, with a unity turns ratio for transformer 28, the resistance of winding 37 should be reduced by a factor of four to 6,800 ohms.

If inductor 17 is eliminated and a small capacitance value for capacitor 18 is provided, no appreciable change in the characteristics of curve R will result. For example if capacitor 18 has a value of 92.6 micromicrofarads, then its capacitance reactance will be 10,800 ohms. The inductive reactance of the parallel circuit comprising capacitor 18 and coils 11 and 13 will be 10,800 ohms, providing an increase in apparent inductance by a factor of two to 10.8 millihenrys. The total series current is reduced by the factor of two to 2.55 milliamperes to maintain the current through coils 11 and 13 at 5.1 milliamperes. The rate of change of apparent inductance with current $$\frac{dL}{dI} = D$$

will be increased by a factor of eight. The maximum value of the quantity $T = ID$ will be increased by a factor of four to $-27.2$ millihenrys. The maximum value of R is increased by a factor of four to 13,600 ohms. Here R exceeds the inductive reactance. Thus we must eliminate capacitor 25 and provide inductor 24 with a value of 2.8 millihenrys and a reactance of 2,800 ohms. It is found that a value of 68.4 micromicrofarads for capacitor 18 requires that no reactance be provided between terminals 26 and 27. A 68.4 micromicrofarad capacitor has a reactance of 14,500 ohms. The inductive reactance of the parallel circuit is 8,570 ohms providing an apparent inductance of 8.57 millihenrys. The maximum value of R is also 8,570 ohms. Here the series circuit resembles a parallel circuit comprising coils 11 and 13, capacitor 18 and load R between terminals 34 and 35 with terminals 27 and 26 being short-circuited. But it will be noted that this transitory configuration provides an inductive parallel circuit with radical changes in the required impedance between terminals 26 and 27 for small changes in component values. If capacitor 18 exceeds 68.4 micromicrofarads, then the reactance between terminals 26 and 27 must be inductive. If capacitor 18 is less than 68.4 micromicrofarads, then the reactance between terminals 26 and 27 must be capacitive.

Thus far we have determined only the operating point for maximally flat R. It will be appreciated that we may choose a series circuit operating point less than 5.1 milliamperes at, for example, 4.6 milliamperes. In such event, the reactance between terminals 26 and 27 should place the maximum value of M at, for example, 3.6 milliamperes. Thus, the value of K at the operating point would not be unity. However, $R=-_wTM$ would have its maximum value at the operating point of 4.6 milliamperes. For currents greater than 4.6 milliamperes, T would increase while M would decrease. For currents less than 4.6 milliamperes, M would increase while T would decrease. This displacement of the maxima of the curves M and T on either side of the operating point will decrease the maximum value of R and will tend to decrease somewhat the range of currents over which R is substantially constant. The maximally flat curve R results when the maxima of T, M, and hence R exists at the same current value so that the operating point K is unity. It will be noted that in the parallel circuit, because the curve $t$ can be made substantially constant over the operating region by a proper choice of inductor 46, it is better that the maximum of M occur at the operating point so that $k$ is unity. For some nonlinear inductors in the parallel circuit, curve $n$ may exhibit a peak (as curve T) when the percentage change of inductance is too small. In such event it will be necessary to increase the sensitivity of the parallel circuit to obtain a constant value for curve $t$ in the operating region. Thus, inductor 46 would be eliminated and the increased sensitivity obtained by capacitor 44. If the capacitance of capacitor 44 were too small, then curve $t$ would approach curve $n$ and exhibit no peak. If capacitor 44 were too large, then curve $t$ would continue to exhibit a peak. Regardless of the inherent sensitivity of coils 41 and 43 in conjunction with the nonlinear iron of cores 40 and 42, there will always exist some inductive or capacitance reactance which when placed in series with the non-linear inductor will result in a constant value region for curve $t$.

The intelligence frequencies introduced by tape 16 will modulate the carrier having a frequency $w$. This creates upper and lower sideband frequencies as is well known in the art. Thus far we have assumed that frequency is a constant equal to $w$. It will be appreciated however that my circuits are frequency sensitive. In both forms of my invention, the natural resonant frequency is less than the carrier frequency $w$. For both the series and the parallel circuit, a reduction from the carrier frequency $w$ results in an approach to resonance and hence in an augmented response. Thus the lower side-band has an augmented response while the upper side-band has a diminished response. If the intelligence frequencies are small compared with the carrier frequency $w$, then the differences between the side-band frequencies and the carrier will be small; and the total response to the sum of the two sideband frequencies will not decrease appreciably. As the intelligence frequencies increase to greater and greater percentages of the carrier frequency, the gain of each stage will ultimately decrease, introducing phase-lags in my two-stage feed-back amplifier. Furthermore, because of the inherent inductance of load winding 37, there will exist some intelligence frequency beyond which the control flux in member 38 will no longer be proportional to the voltage impressed on winding 37. Of course this will be a very high frequency because of the high resistance of winding 37, yielding a small time-constant. With this attenuation is associated an additional phase-lag. Smoothing inductor 72 in conjunction with filter capacitor 71 introduce further phase-lag and attenuation as intelligence frequencies assume larger percentages of the carrier frequency. As will be appreciated by those skilled in the art, the sum of these phase-lags may exceed 180° before the loop gain has decreased to unity and thus produce instability. To preclude an unstable feed-back system, it may be necessary to provide phase-lead circuits (not shown) of any type known to the art. Other methods of insuring stability will be apparent to those having ordinary skill in the art. The extrinsic negative feedback provided by winding 82 causes the closed loop gain to be substantially independent of the actual stage gains. Accordingly the output across 73 will faithfully reproduce the input from tape 16 over extremely wide ranges of amplitude and frequency.

In order that the intelligence frequencies may be a comparatively large percentage of the carrier frequency, it is preferable that the frequency sensitivity of the circuits be small; that is the circuits should have low Q and hence large bandwidth. The Q of the series circuit is equal to the characteristic resistance $R_0$ of the reactive elements divided by the series resistance; thus:

$$(50) \quad Q_s = \frac{R_o}{R} = \frac{\sqrt{\frac{L}{C}}}{R}$$

We find the series circuit Q with switch 21 open to be:

$$(51) \quad Q_s = \frac{\sqrt{\frac{5.4 \times 10^{-3}}{500 \times 10^{-12}}}}{3400} = 0.97$$

When inductor 17 shunts coils 11 and 13 with 5.4 millihenrys we find:

$$(52) \quad Q_s = \frac{\sqrt{\frac{2.7 \times 10^{-3}}{550 \times 10^{-12}}}}{850} = 2.6$$

Thus the provision of inductor 17 increases the Q and reduces the frequency bandwidth. It will be noted that while the provision of capacitor 18 does not change the narrow peak in R, yet it increases the frequency sensitivity and reduces the bandwidth because of the parallel resonance effect with coils 11 and 13. Hence it is preferable that the capacitance shunting coils 11 and 13 be held to a minimum value. Capacitor 18 thus is not a desirable component and should be eliminated. It will be seen that the provision of inductor 24 increases the total series inductance and requires a reduction in capacitance 25 since R is not affected. This increases the Q and reduces the bandwidth. Inductor 24 thus is not a desirable component and may be eliminated.

The Q of the parallel circuit is equal to the characteristic conductance $G_0$ of the reactive elements divided by the load conductance; thus:

$$(53) \quad Q_p = \frac{G_o}{G} = \frac{\sqrt{\frac{S}{B}}}{G}$$

We find the parallel circuit Q with inductor 46 present to be:

$$(54) \quad Q_p = \frac{\sqrt{\frac{144 \times 10^{-12}}{9 \times 10^{-3}}}}{33 \times 10^{-6}} = 3.84$$

The parallel circuit Q is four times the series circuit Q; and hence the parallel circuit bandwidth is only one-quarter that of the series circuit.

We have thus far considered reducing the parallel circuit sensitivity by the provision of series inductor 46. Let us now close switch 48, thereby eliminating inductor 46, and consider the effect of inductor 53. Inductor 53 placed in parallel with coils 41 and 43 will also reduce the percentage change in L, causing the shape of curve $n$ to approach that of curve T. It was found that a value of 4 millihenrys for inductor 53 yielded a substantially constant value for $t$ in the operating region. For higher values of inductor 53, curve $t$ exhibited no peak and approached curve $n$. For smaller values of inductor 53, curve $t$ exhibited a peak and approached curve T. At the operating point coils 41 and 43 also have an inductance of 4 millihenrys. In order to maintain the current through coils 41 and 43 at their operating point of 6.5 milliamperes, the total series current is increased by a factor of two to 13 milliamperes. The iductance B is reduced by a factor of two to 2 millihenrys. The rate of change of inductance with current $$\frac{dB}{d/I}$$

is reduced by a factor of eight from that given by curve D. The quantity $$T = I\frac{dB}{dI}$$

is reduced by a factor of four to an operating point value of $-1.3$ millihenrys. Using Equation 26 to obtain $t$, we find:

(55) $\qquad t = \frac{-1.3 \times 10^{-3}}{(2 \times 10^{-3})^2} = -330$

It will be noted that this is equal to the operating point value of $n = 330$. Employing Equation 27 to redetermine G, we find:

(56) $\qquad G = \frac{-(-330)(0.5)}{10^6} = 165$ micromhos

This will require that the resistance of load 73 be reduced by a factor of five to 4,900 ohms. At the operating point the inductance is now 2 millihenrys, $k = 1$, and from Equation 20:

(57)

$$wS = G + \frac{1}{wB} = 165 \times 10^{-6} + \frac{1}{10^6(2 \times 10^{-3})} = 665 \text{ micromhos}$$

Capacitor 54 should now have the value:

(58)

$$S = \frac{665 \times 10^{-6}}{w} = \frac{665 \times 10^{-6}}{10^6} = 665 \text{ micromicrofarads}$$

The source voltage at terminals 59 and 60 from regulator 3 from Equation 30 is:

(59)

$$e = 10^6(2 \times 10^{-3})(13 \times 10^{-3})\sqrt{2} = 36.8 \text{ volts R.M.S.}$$

Redetermining the parallel circuit Q with inductor 46 eliminated and a value of 4 millihenrys for inductor 54, we find from Equation 53:

(60) $\qquad Q_p = \frac{\sqrt{\frac{665 \times 10^{-12}}{2 \times 10^{-3}}}}{165 \times 10^{-6}} = 3.5$ We see then that either of inductors 46 or 53 may be used to increase the range of currents over which curve $t$ is substantially constant. But shunting inductor 53 is preferable because it reduces the parallel circuit Q slightly thus increasing the bandwidth. It will also be noted that, even with inductor 53, the parallel circuit Q is about four times that of the series circuit. This shows that the series circuit bandwidth is nearly four times that of even an optimum design parallel circuit. The advantage of the parallel circuit appears where a high-efficiency high-power-output stage is required to provide load currents varying by a large percentage from the operating point current. For the parallel circuit, if curve $n$ exhibits a peak and the sensitivity of the coils 41 and 43 is too small, then capacitor 44 must be provided. However, this will increase frequency sensitivity and reduce bandwidth because of the series resonance effect of capacitor 44 with coils 41 and 43. Hence it is preferable that coils 41 and 43 in conjunction with the material of cores 40 and 42 produce sufficient current sensitivity that capacitor 44 is not required and may be eliminated.

The natural resonant frequency of an inductance and capacitance circuit is:

(61) $\qquad w_n = \frac{1}{\sqrt{LC}} = \frac{1}{\sqrt{BS}}$

Thus the natural resonant frequencies of the two series circuits are:

(62) $\qquad w_s = \frac{1}{\sqrt{(5.4 \times 10^{-3})(500 \times 10^{-12})}} = 0.61 \times 10^6$

(63) $\qquad w_s = \frac{1}{\sqrt{(2.7 \times 10^{-3})(550 \times 10^{-12})}} = 0.82 \times 10^6$ The natural resonant frequencies of the two parallel circuits are:

(64) $\qquad w_p = \frac{1}{\sqrt{(9 \times 10^{-3})(144 \times 10^{-12})}} = 0.88 \times 10^6$

(65) $\qquad w_p = \frac{1}{\sqrt{(2 \times 10^{-3})(665 \times 10^{-12})}} = 0.87 \times 10^6$ All resonant frequencies are less than the carrier frequency $w = 10^6$. Upper side-band frequencies become more and more seriously attenuated. However, lower side-band frequencies are increasing augmented until they become equal to the natural resonant frequency. When the lower side-band frequency is less than $w_n$, then it too suffers increasing attenuation. We conveniently may consider the intelligence frequency bandwidth to be the difference between the carrier frequency $w$ and the natural resonant frequency $w_n$. For the optimum series circuits, the intelligence bandwidth is accordingly $(1-.61)10^6 = 0.39 \times 10^6$ radians per second, which represents a frequency of 62,000 cycles per second. For the other series circuit with inductor 17, the bandwidth is $(1-.82)10^6 = 0.18 \times 10^6$ radians per second, representing a frequency of 29,000 cycles per second. For the optimum design parallel circuit with inductor 53, the intelligence bandwidth is $(1-.87)10^6 = 0.13 \times 10^6$ radians per second, which represents a frequency of 21,000 cycles per second. For the parallel circuit with inductor 46, the bandwith is $$(1-.88)10^6 = 0.12 \times 10^6$$

radians per second, which represents a frequency of 19,000 cycles per second. Even 19,000 cycles per second is entirely adequate for a maximum anticipated intelligence frequency of only 16,000 cycles, especially when extrinsic negative-feedback is employed, as shown.

It will be appreciated that I may provide in place of center-tapped inductor 64 a transformer similar to transformer 28 where it is desired to use a different value for load 73 while maintaining the same conductance G between terminals 59 and 60. It has been assumed that the components are ideal. In practice coils 11 and 13 do introduce some series resistance. In order that the total series resistance be maintained at the infinite gain value R, it is necessary to decrease the resistance of load winding 37 a proportionate amount. Coils 41 and 43 present some dissipation equivalent to a shunt conductance. Accordingly it is necessary to decrease the conductance of load 73 proportionately to preserve the infinite gain value of conductance G. Those ordinarily skilled in art will realize that some small allowance must also be made for residual inductances and stray capacitances.

It is desired that the time-constant associated with winding 37 be sufficiently small to pass the maximum intelligence frequencies of which the optimum design series circuit is capable. For the series circuit the maximum intelligence band width was shown to be $0.39 \times 10^6$ radians per second or 62,000 cycles per second. The resistance associated with winding 37 should be 27,200 ohms. If the inductance of winding 37 is 70 millihenrys, then it will have an impedance of 27,200 ohms at 62 kilocycles. If a higher cut-off frequency is desired, then the inductance of winding 37 must accordingly be reduced to less than 70 millihenrys. It is desired that winding 37 have as great an inductance as possible since this will increase the gain. The resistance values of a 70 millihenry inductor even when wound with very fine resistance wire will not ordinarily be sufficiently high. Accordingly it will be necessary to provide an auxiliary resistor 37a in series with winding 37 so that the total series resistance is made equal to 27,200 ohms. The distributed capacitance associated with the 70 millihenrys of winding 37 will ordinarily be somewhat less than 10 mircomicrofarards. Thus, the self-resonant frequency of inductor 37 will be somewhat greater than 200 kilocycles, and this is considerably greater than the cut-off intelligence frequency of 62 kilocycles.

The bandwidth of my magnetic field detector is directly proportional to the carrier frequency employed. For example, if it is desired to amplify intelligence frequencies extending to 39 megacycles, then a carrier frequency of 100 megacycles would be used. If it is desired that the intelligence frequency bandwidth be 62 megacycles, then the carrier frequency should be increased to 160 megacycles. These figures obtain for series circuits; and of course, the non-linear inductors must be appropriately scaled down to the microhenry range as will be appreciated by those ordinarily skilled in the art.

It is often convenient to consider impedances in frequency scaling since they are more readily normalized. For series circuits let:

(66) $$H = w\left(\frac{dL}{dI}\right)$$

Thus:

(67) $$R = -HIM$$

For parallel circuits let:

(68) $$h = w\left(\frac{dB}{dI}\right)$$

and let:

(69) $$b = wB$$

Thus:

(70) $$G = -\frac{hIm}{b^2}$$

Equations 67 and 70 are useful in determining appropriate values for the non-linear inductors when carrier frequencies are scaled. Where it is desired to extend bandwidths to larger percentages of the carrier frequency, the Q of my circuits may be further reduced by increasing R and G appreciable above their infinite gain values. This reduces the intrinsic positive feedback, reducing the gain, but increases the frequency range over which the gain is constant. Where no extrinsic stabilizing negative feedback is employed (as provided by winding 82), then R and G should exceed their infinite gain values by a reasonable stability margin of, for example, one-tenth. Thus, for FIGURE 5, in absence of extrinsic negative feedback, R should not be less than 3700 ohms and G should not be less than 36 micromhos.

It will be seen that I have accomplished the objects of my invention. My magnetic field detector employs magnetic cores of conventional materials providing gradually changing inductance values. The voltages and currents are substantially sinusoidal with no even harmonic and very little odd harmonic content due to push-pull cancellation or suppression. Extremely high carrier frequencies may be employed which result in large intelligence bandwidths extending to zero cycles per second representing static fields. Intelligence frequencies may furthermore assume large percentage bandwidths relative to the carrier because of the extremely low Q values of my circuits, yielding natural resonant frequencies much less than the carrier frequency. My magnetic field detector has appreciable power output capabilities, since voltages and currents may vary considerably from their operating point values. The gain of my magnetic field detector is extremely high and may be made to approach infinity.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention what I claim is:

1. A magnetic field detector including in combination a non-linear inductor having an inductance which within a certain region decreases with increase in current therethrough, a frequency responsive circuit including the inductor, a constant frequency source, means connecting the source to the circuit, the source providing such output to operate the inductor within said region, the circuit having a frequency of maximum response which is appreciably less than the source frequency, means for coupling to the inductor the magnetic field to be detected, and means responsive to the fundamental source frequency component of current through the circuit for providing a detection signal.

2. A magnetic field detector including in combination a non-linear inductor having an inductance which within a certain region decreases with increase in current therethrough, a first circuit including the inductor, the first circuit being substantially reactive, a constant frequency source, a second circuit which is substantially resistive at the source frequency, a frequency responsive third circuit including the reactive first circuit and the resistive second circuit, means connecting the source to the third circuit, at the source frequency the reactance of the first circuit being of the same order of magnitude as the resistance of the second circuit, the source providing such output to operate the inductor within said region, the third circuit having a frequency of maximum response which is appreciably less than the source frequency, and means for coupling to the inductor the magnetic field to be detected.

3. A multiple-stage magnetic field detector including in combination a first non-linear inductor having an inductance which within a certain region decreases with increase in current therethrough, a second non-linear inductor having an inductance which within a certain range decreases with increase in current therethrough, a first circuit including the first inductor, a capacitor, a second circuit including the second inductor and the capacitor, the first and second circuits being substantially reactive, a first constant frequency source, a second constant frequency source, a third circuit which is substantially resistive at the first source frequency, a fourth circuit which is substantially resistive at the second source frequency, a frequency-responsive fifth circuit including the first and third circuits, a sixth circuit including the second and fourth circuits, means connecting the first source to the fifth circuit, means connecting the second source to the sixth circuit, at the first source frequency the reactance of the first circuit being inductive, at the second source frequency the reactance of the second circuit being capacitive, the first source providing such output to operate the first inductor within said region, the second source providing such output to operate the second inductor within said range, the fifth circuit having a frequency of maximum response which is appreciably less than the first source frequency, the sixth circuit having a resonant frequency which is appreciably less than the second source frequency, means for coupling to the first inductor the magnetic field to be detected, and means including the third circuit for impressing magnetizing forces on the second inductor.

4. A magnetic field detector including in combination a non-linear inductor having an inductance which within a certain region decreases with increase in current therethrough, a constant frequency source, a first circuit which is substantially resistive at the source frequency, a second circuit including the inductor, the second circuit presenting an inductive reactance at the source frequency, a third circuit including the first and second circuits, means connecting the source to the third circuit, the source providing such current through the second circuit that the quantity HI is of the same order of magnitude as its maximum value, the first circuit presenting a resistance which is of the same order of magnitude as the quantity:

$$HI\left(\frac{K}{1+K^2}\right)$$

where K is the ratio of the inductive reactance of the second circuit to the apparent resistance of the first circuit at the source of frequency, K being of the order of magnitude of unity, where I is the current through the second circuit, and where H is the rate of decrease of inductive reactance of the second circuit with increase of current through the second circuit at the source frequency when the current through the inductor is within said region, and means for coupling to the inductor the magnetic field to be detected.

5. A magnetic field detector including in combination a non-linear inductor having an inductance which within a certain region decreases with increase in current therethrough, a constant frequency source, a first circuit which is substantially resistive at the source frequency, a second circuit including the inductor, the second circuit presenting an inductive reactance at the source frequency, a third circuit including the first and second circuits, means connecting the source to the third circuit, the third circuit being operated about the maximum value of the quantity:

$$HI\left(\frac{K}{1+K^2}\right)$$

and the first circuit presenting a resistance which is of the same order of magnitude as the maximum value of said quantity, where K is the ratio of the inductive reactance of the second circuit to the apparent resistance of the first circuit at the source frequency, where I is the current through the second circuit, and where H is the rate of decrease of inductive reactance of the second circuit with increase of current through the second circuit at the source frequency when the current through the inductor is within said region, and means for coupling to the inductor the magnetic field to be detected.

6. A magnetic field detector including in combination a non-linear inductor having an inductance which within a certain region decreases with increase in current therethrough, a constant frequency source, a first circuit which is substantially resistive at the source frequency, a capacitor, means connecting the inductor and the capacitor in a series circuit, the series circuit presenting an inductive reactance at the source frequency, a third circuit including the first circuit and the series circuit, means connecting the source to the third circuit, the source providing such output that the current through the second circuit is approximately equal to that current for which the quantity HI is a maximum, the first circuit presenting a resistance which is of the same order of magnitude as the quantity:

$$HI\left(\frac{K}{1+K^2}\right)$$

where K is the ratio of the inductive reactance of the second circuit to the apparent resistance of the first circuit at the source frequency, K being approximately equal to unity, where I is the current through the second circuit, where H is the rate of decrease of inductive reactance of the second circuit with increase of current through the second circuit at the source frequency when the current through the inductor is within said region, and means for coupling to the inductor the magnetic field to be detected.

7. A magnetic field detector including in combination a non-linear inductor having an inductance which within a certain region decreases with increase in current therethrough, a constant frequency source, a first circuit which is substantially conductive at the source frequency, a substantially reactive impedance, a second circuit including the inductor and the reactive impedance, the second circuit presenting an inductive reactance at the source frequency, a capacitor, means connecting the second circuit and the capacitor in a parallel circuit, the parallel circuit presenting a capacitive susceptance at the source frequency, a third circuit including the first circuit and the parallel circuit, means connecting the source to the third circuit, the second circuit having the characteristic that a substantially constant value over a wide range of currents through the second circuit is exhibited by the quantity:

$$\frac{hI}{b^2}$$

and the source providing such output that the current through the second circuit is within said range, the first circuit presenting a conductance which is of the same order of magnitude as the quantity:

$$\frac{hI}{b^2}\left(\frac{k}{1+k^2}\right)$$

where $k$ is the ratio of the capacitive susceptance of the parallel circuit to the apparent conductance of the first circuit at the source frequency, $k$ being approximately equal to unity, where I is the current through the second circuit, where $b$ is the inductive reactance of the second circuit at the source frequency, where $h$ is the rate of decrease of inductive reactance of the second circuit with increase of current through the second circuit at the source frequency when the current through the inductor is within said region, and means for coupling to the inductor the magnetic field to be detected.

8. A magnetic field detector including in combination a non-linear inductor having an inductance which within a certain region decreases with increase in current therethrough, a constant frequency source, a first circuit which is substantially conductive at the source frequency, a linear inductance, a second circuit including the non-linear inductor and the linear inductance, the second circuit presenting an inductive reactance at the source frequency, a capacitor, means connecting the second circuit and the capacitor in a parallel circuit, the parallel circuit presenting a capacitive susceptance at the source frequency, a third circuit including the first circuit and the parallel circuit, means connecting the source to the third circuit, the second circuit having the characteristic that a substantially constant value over a wide range of currents through the second circuit is exhibited by the quantity:

$$\frac{hI}{b^2}$$

and the source providing such output that the current through the second circuit is approximately centered within said range, the first circuit presenting a conductance which is of the same order of magnitude as the quantity:

$$\frac{hI}{b^2}\left(\frac{k}{1+k^2}\right)$$

where $k$ is the ratio of the capacitive susceptance of the parallel circuit to the apparent conductance of the first circuit at the source frequency, $k$ being approximately equal to unit, where I is the current through the second circuit, where $b$ is the inductive reactance of the second circuit at the source frequency, where $h$ is the rate of decrease of inductive reactance of the second circuit with increase in current through the second circuit at the source frequency when the current through the non-linear inductor is within said region, and means for coupling 9. A magnetic field detector as in claim 8 in which the linear inductance is connected in series with the non-linear inductor.

10. A magnetic field detector as in claim 8 in which the linear inductance is connected in parallel with the non-linear inductor.

11. A magnetic field detector including in combination a non-linear inductor having an inductance which within a certain region decreases with increase in current therethrough, a constant frequency source, a capacitor, a circuit including the inductor and the capacitor, means connecting the source to the circuit, the source providing such output to operate the inductor within said region, the circuit having a resonant frequency which is appreciably less than the source frequency, and means for coupling to the inductor the magnetic field to be detected.

12. A magnetic field detector including in combination a non-linear inductor having an inductance which within a certain region decreases with increase in current therethrough, a constant frequency source, a first circuit which is substantially resistive at the source frequency, a second circuit including the inductor and the first circuit, means connecting the source to the second circuit, the source providing such output to operate the inductor within said region, the second circuit being frequency responsive and having a frequency of maximum response which is appreciably less than the source frequency, and means for coupling to the inductor the magnetic field to be detected, the first circuit including a band-pass filter circuit tuned to the source frequency and rectifying means and a low-pass filter circuit and means connecting the band-pass filter circuit to the rectifying means and means connecting the rectifying means to the low-pass filter circuit.

13. A magnetic field detector including in combination a non-linear inductor having an inductance which within a certain region decreases with increase in current therethrough, a frequency responsive circuit including the inductor, a constant frequency source, means connecting the source to the circuit, the circuit having a frequency of maximum response which is appreciably less than the source frequency, the source providing such output to operate the inductor within said region, and means for coupling to the inductor the magnetic field to be detected, the non-linear inductor including a pair of windings so linking a non-linear ferro-magnetic core as to produce cancellation of even harmonics of the source frequency.

14. A magnetic field detector including in combination a non-linear inductor having an inductance which within a certain region decreases with increase in current therethrough, a capacitor, a circuit including the inductor and the capacitor, a constant frequency source, means connecting the source to the circuit, the circuit having a resonant frequency which is appreciably less than the source frequency, the source providing such output to operate the inductor within said region, means for coupling to the inductor a magnetic field having a maximum amplitude, and means for biasing the inductor with a magnetizing force at least equal to the maximum amplitude of said magnetic field.

15. A magnetic field detector including in combination an non-linear inductor having an inductance which within a certain region decreases with increase in current therethrough, a constant frequency source, a first circuit which is substantially resistive at the source frequency, a second circuit including the first circuit and the inductor, means connecting the source to the second circuit, the second circuit being frequency responsive and having a frequency of maximum response which is appreciably less than the source frequency, the source providing such output to operate the inductor within said region, input means, and means including both the first circuit and the input means for coupling to the inductor a differential magnetic field.

16. A magnetic field detector including in combination a non-linear inductor having an inductance which within a certain region decreases with increase in current therethrough, a constant frequency source, a first circuit which is substantially resistive at the source frequency, a second circuit including the inductor and the first circuit, means connecting the source to the second circuit, the source providing such output to operate the inductor within said region, the first circuit having a critical resistance value for which the second circuit is unstable, the resistance presented by the first circuit at the source frequency being of the same order of magnitude as said critical value, and means for coupling to the inductor the magnetic field to be detected.

17. A magnetic field detector as in claim 16 in which the second circuit presents a partially inductive load to the source and in which the resistance presented by the first circuit at the source frequency is not appreciably less than said critical value.

18. A magnetic field detector as in claim 16 in which the second circuit presents a partially capacitive load to the source and in which the resistance presented by the first circuit at the source frequency is not appreciably greater than said critical value.

19. A magnetic field detector including in combination a non-linear inductor having an inductance which within a certain region decreases with increase in current therethrough, a constant frequency source, a first circuit which is substantially resistive at the source frequency, a second circuit including the inductor and the first circuit, means connecting the source to the second circuit, the source providing such output to operate the inductor within said region, the first circuit having a critical resistance value for which the second circuit is unstable, the resistance presented by the first circuit being approximately equal to said critical value, input means, and means including both the first circuit and the input means for coupling to the inductor a differential magnetic field.

References Cited by the Examiner

UNITED STATES PATENTS

| | | | |
|---|---|---|---|
| 2,406,360 | 8/46 | Ellwood | 324—43 X |
| 2,518,865 | 8/50 | Cartotto | 317—148 |
| 2,608,621 | 8/52 | Peterson | 324—43 X |
| 2,649,568 | 8/53 | Felch et al. | 324—34 |
| 2,722,569 | 11/55 | Loper | 179—100.2 |
| 2,822,533 | 2/58 | Duinker et al. | 324—43 X |
| 2,870,270 | 1/59 | Nagai et al. | 179—100.2 |
| 2,974,277 | 3/61 | Wales | 324—43 |

WALTER L. CARLSON, *Primary Examiner.*

LLOYD McCOLLUM, FREDERICK M. STRADER,
*Examiners.*

UNITED STATES PATENT OFFICE
CERTIFICATE OF CORRECTION

Patent No. 3,207,978            September 21, 1965

Hrant H. Sarkissian

It is hereby certified that error appears in the above numbered patent requiring correction and that the said Letters Patent should read as corrected below.

Column 19, line 18, for "source of frequency" read -- source frequency --.

Signed and sealed this 29th day of March 1966.

(SEAL)
Attest:

ERNEST W. SWIDER
Attesting Officer

EDWARD J. BRENNER
Commissioner of Patents